United States Patent
Palmaer

(10) Patent No.: US 6,345,715 B2
(45) Date of Patent: *Feb. 12, 2002

(54) ROD RETENTION SYSTEM FOR MODULAR PLASTIC CONVEYOR BELT

(75) Inventor: Eric K. Palmaer, Granite Bay, CA (US)

(73) Assignee: KVP Falcon Plastic Belting, Inc., Sacramento, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,230

(22) Filed: Nov. 3, 1998

(51) Int. Cl.⁷ .......................... B65G 17/06; B65G 17/38
(52) U.S. Cl. ....................................... 198/853; 198/852
(58) Field of Search ................................. 198/853, 852

(56) References Cited

U.S. PATENT DOCUMENTS

| | | | | |
|---|---|---|---|---|
| 2,126,274 A | * | 8/1938 | Noffsinger et al. | 198/853 |
| 2,363,932 A | * | 11/1944 | Beers | 198/853 |
| 3,159,267 A | * | 12/1964 | Jeffrey | 198/853 |
| 3,363,745 A | * | 1/1968 | Thuerman et al. | 198/853 |
| 3,920,117 A | * | 11/1975 | Roinestad | 198/853 |
| 4,153,152 A | * | 5/1979 | Lapeyre | 198/851 |
| 4,159,763 A | * | 7/1979 | Kewley et al. | 198/853 |
| 4,271,960 A | * | 6/1981 | Chalich | 198/779 |
| 4,272,952 A | * | 6/1981 | Graham | 59/84 |
| 4,469,221 A | * | 9/1984 | Albert | 198/853 |
| 4,645,070 A | * | 2/1987 | Homeier | 198/831 |
| 4,742,907 A | | 5/1988 | Palmaer | 198/831 |
| 4,893,710 A | | 1/1990 | Bailey et al. | 198/853 |
| 4,901,844 A | | 2/1990 | Palmaer et al. | 198/778 |
| 4,925,016 A | | 5/1990 | Lapeyre | 198/834 |
| 4,953,693 A | * | 9/1990 | Draebel | 198/853 |
| 4,993,544 A | | 2/1991 | Bailey et al. | 198/834 |
| 5,058,732 A | | 10/1991 | Lapeyre | 198/852 |
| 5,069,330 A | | 12/1991 | Palmaer et al. | 198/778 |
| 5,083,660 A | * | 1/1992 | Horton | 198/853 |
| 5,096,050 A | * | 3/1992 | Hodlewsky | 198/779 |
| 5,096,053 A | * | 3/1992 | Hodlewsky | 198/853 |
| 5,105,938 A | * | 4/1992 | Tan | 198/853 |
| 5,123,524 A | | 6/1992 | Lapeyre | 198/834 |

(List continued on next page.)

Primary Examiner—Donald P. Walsh
Assistant Examiner—Richard Ridley
(74) Attorney, Agent, or Firm—Thomas M. Freiburger

(57) ABSTRACT

Rod retention systems are disclosed for modular plastic conveyor belts. In one embodiment the connecting rods, which pass through interdigited link ends of successive modules, each include a circumferential groove at one location, receiving a retaining clip at a position between adjacent interdigited link ends, snapped into position in the groove. The retaining clip provides easy assembly using existing tools, and a rod can easily be removed from the belt by applying sharp force on the end of the rod. In a second embodiment a rod retention system has blocking members at both ends of each module row, forming edges of the belt. A space about two or three link ends wide extends laterally from the blocking member to the first rod-encircling link end in board of the blocking member; within the space the module is devoid of link end structure which would confine the rod from the bottom of the belt. The rod is forced into a bending configuration for insertion and removal from the bottom of the belt, and assumes a substantially straightened, normal configuration after insertion. In another embodiment the belt has an opening at the location of the blocking structure, aligned with the series of link end openings, but the rod end is preformed in a bent configuration. In a further embodiment the rods each have heads on one end, and the heads reside inboard of the blocking structure in the assembled belt.

16 Claims, 7 Drawing Sheets

U.S. PATENT DOCUMENTS

| | | | |
|---|---|---|---|
| 5,156,262 A | 10/1992 | Horton | 198/853 |
| 5,156,264 A | 10/1992 | Lapeyre | 198/852 |
| 5,181,601 A * | 1/1993 | Palmaer et al. | 198/853 |
| 5,224,583 A | 7/1993 | Palmaer et al. | 198/779 |
| 5,332,084 A | 7/1994 | Greve | 198/833 |
| 5,372,248 A | 12/1994 | Horton | 198/852 |
| 5,573,105 A | 11/1996 | Palmaer | 198/853 |
| 5,573,106 A * | 11/1996 | Stebnicki | 198/853 |
| 5,598,916 A | 2/1997 | Horton et al. | 198/852 |

* cited by examiner

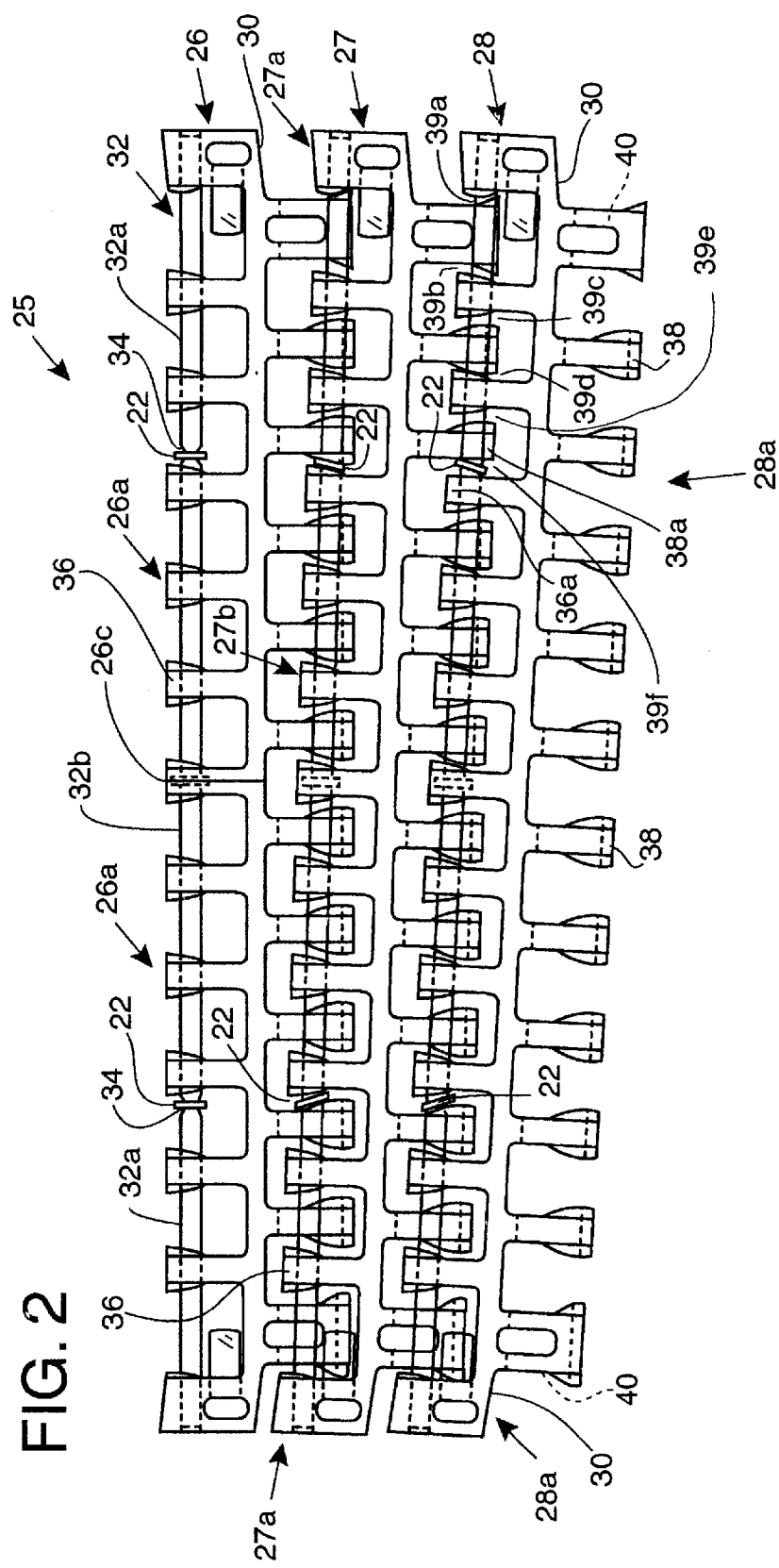

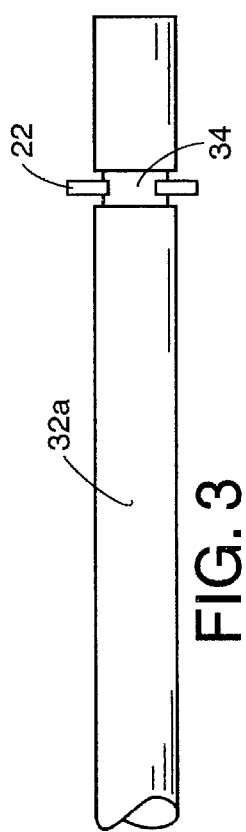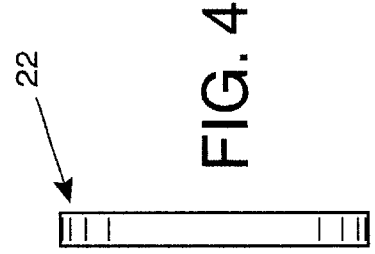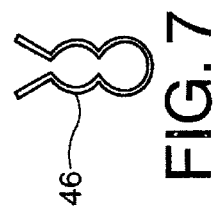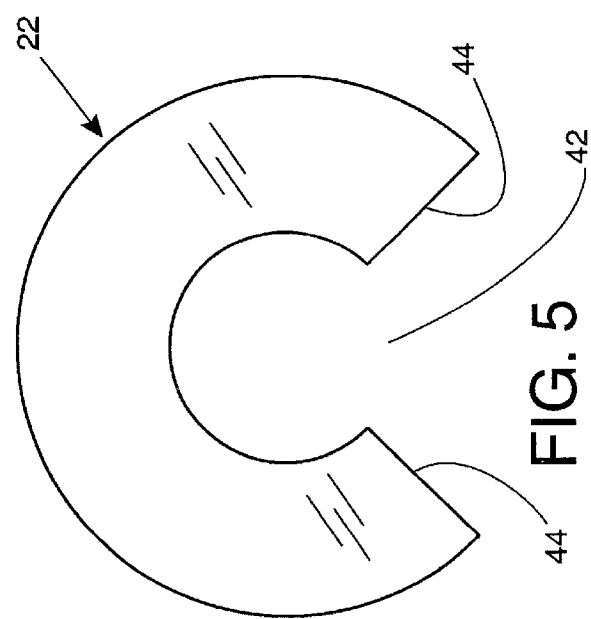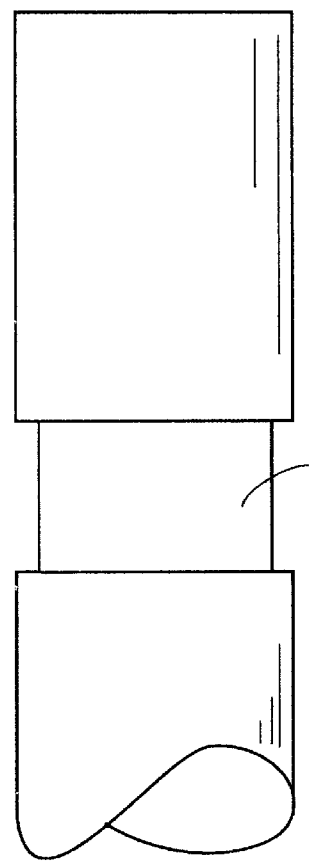

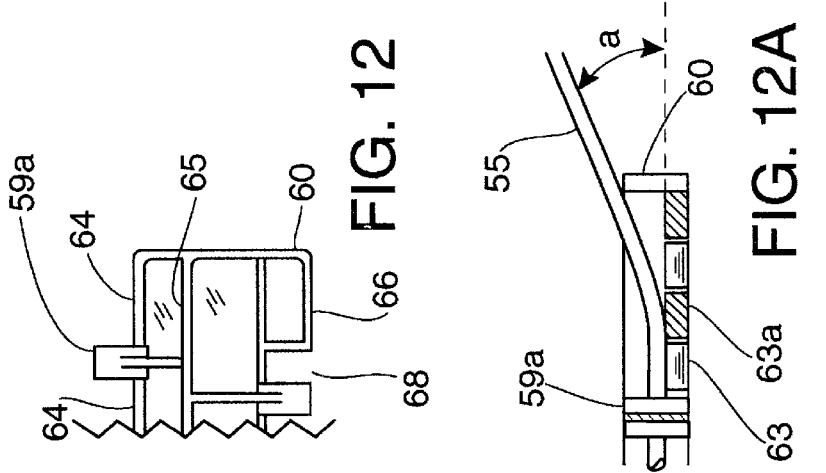
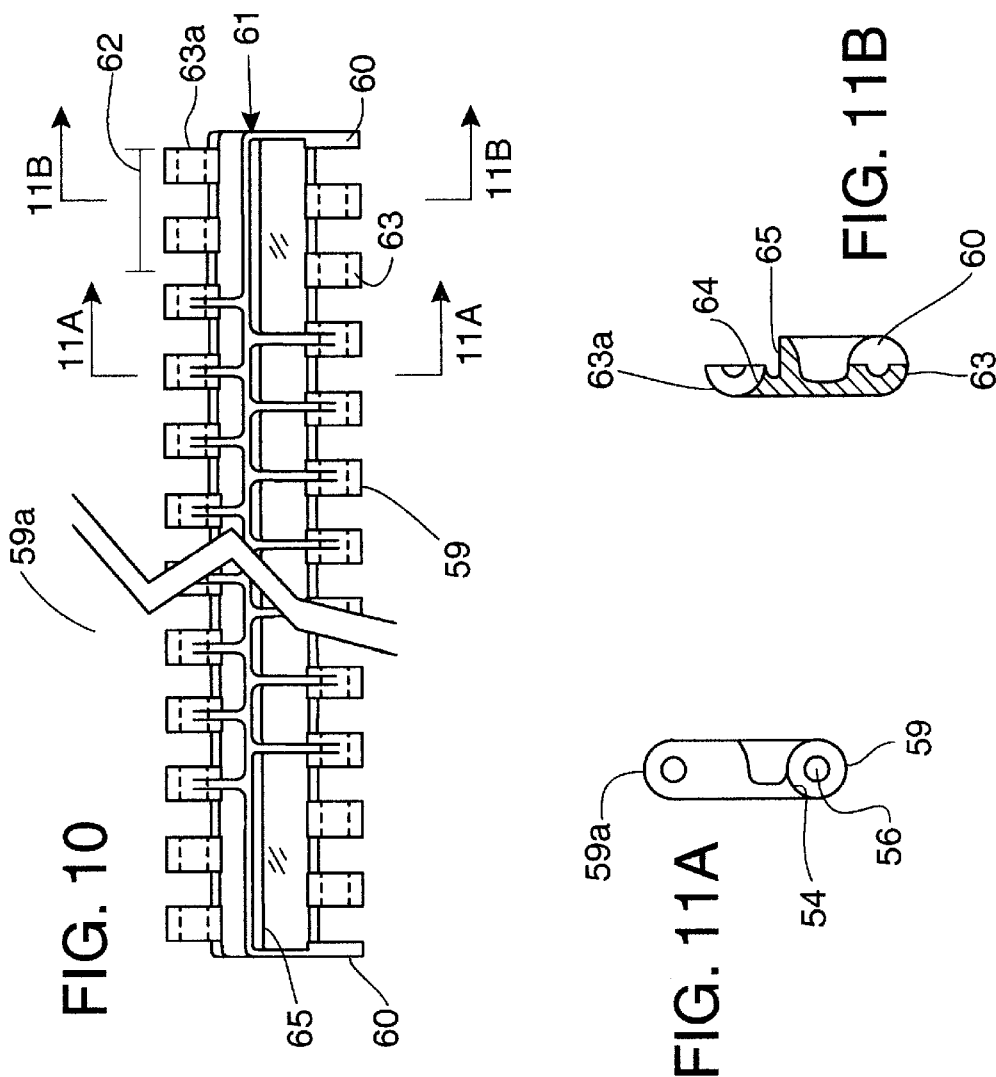

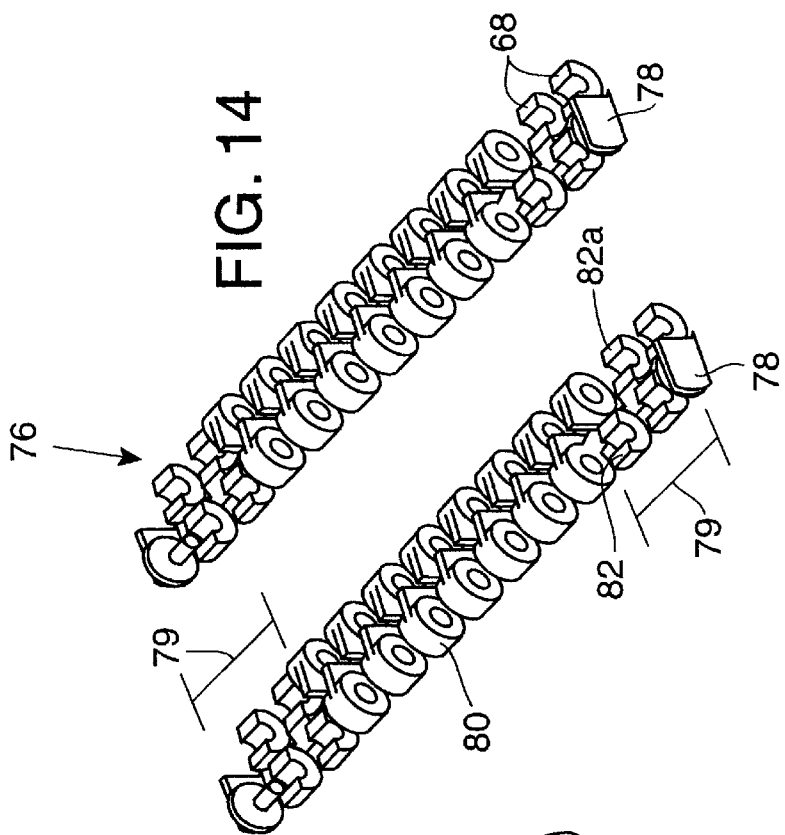
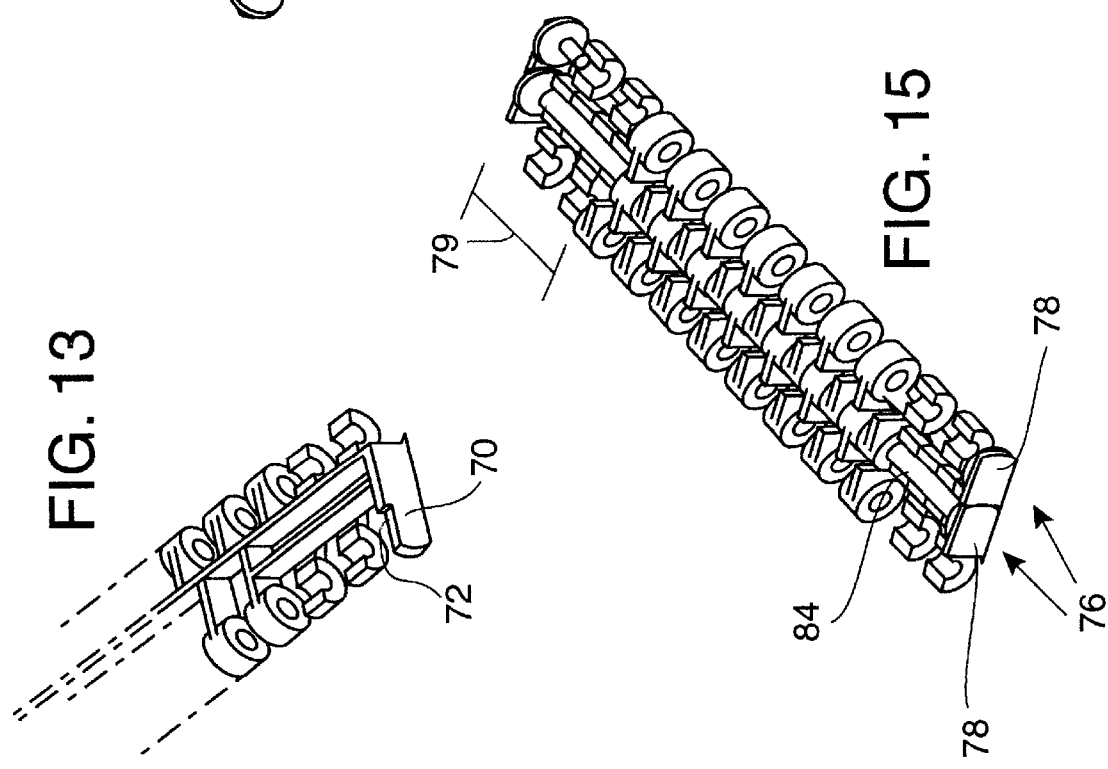

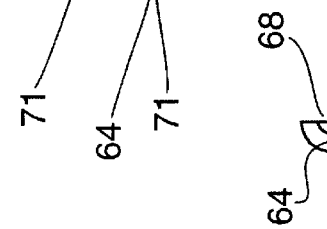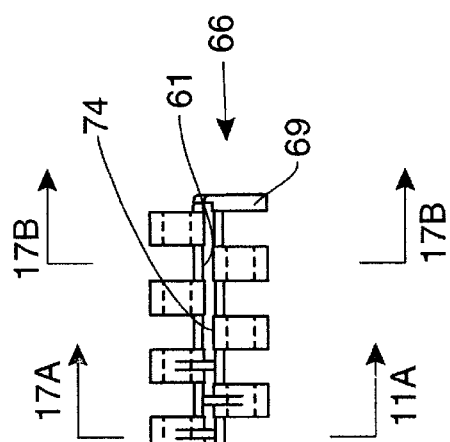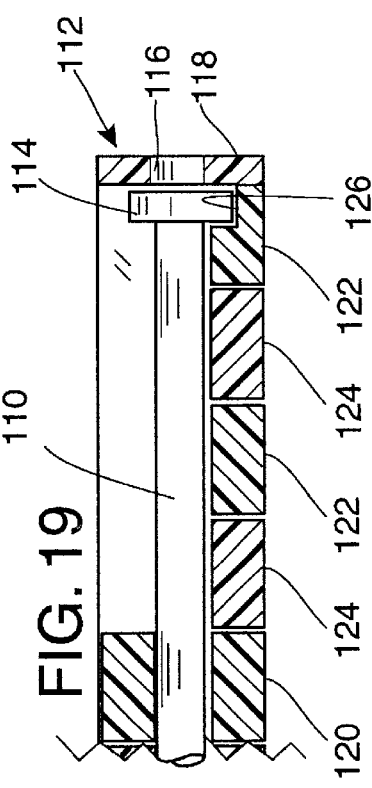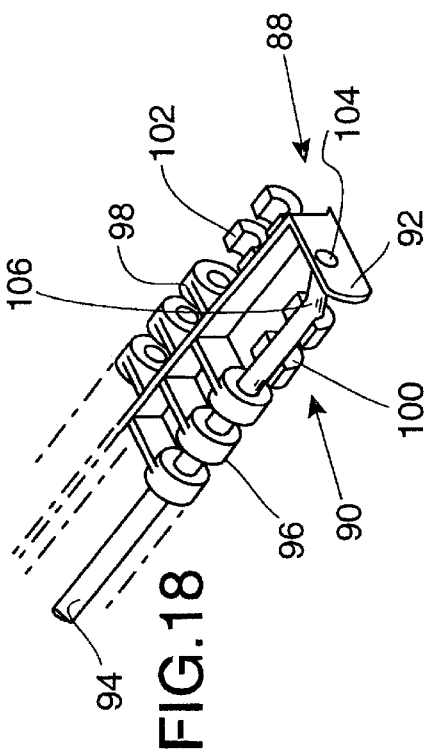

ROD RETENTION SYSTEM FOR MODULAR PLASTIC CONVEYOR BELT

BACKGROUND OF THE INVENTION

The invention is concerned with modular plastic conveyor belts, and in particular relates to retention of connecting rods in such belts.

Examples of modular plastic conveyor belts are shown in U.S. Pat. Nos. 4,742,907, 4,901,844, 5,069,330, 5,181,601 and 5,224,583. The conveyor belts are shown formed of plastic modules having sets of link ends or projections extending in fore and aft directions, for interdigiting with similar preceding and succeeding modules. The interdigited projections have transverse openings through which pass connecting rods, typically also of plastic. Each module row includes one or more modules side by side, and the belts can be made up in virtually any length and width, within practical limits.

The connecting rods of belts such as disclosed in the above referenced patents, and those of other belts of the same general type, must be retained against lateral movement so as to prevent them from extending transversely out of the belt, which would allow the belt to separate between succeeding modules. This need has been addressed in several different ways. U.S. Pat. No. 4,904,844 describes the use of recesses in end members of the integral plastic modules or in separate side plate members at the outside of the belt, to receive connecting rod heads in countersunk relationship. Such rod heads can be formed in the ends of assembled rods by deformation of the rod end, sometimes called "buttoning".

U.S. Pat. No. 5,181,601 describes a different approach wherein a connecting rod has an integral, enlarged collar or interference ring on the rod, to be forced into and engaged with the inside of a bore in a plastic module, the bore having a slightly smaller diameter than the interference ring. This creates a positive press fit engagement between the rod and module, so that the rod is tightly retained relative to one module. Rod heading could be eliminated. The same patent also disclosed the use of three separate connecting rod sections serving as a connecting rod for each pair of adjacent modules, with the two outer rod sections retained by the interference fit described above, and a middle rod section floating between the ends of the outer rod sections.

Other conveyor belts have employed rod heads, on a one-piece connecting rod, to retain the rod in the belt.

Further approaches to retaining connecting rods without rod heads have been suggested. One approach is a spring clip inserted into a receptacle in an edge link end, as in U.S. Pat. No. 5,123,524. Other approaches have sometimes involved an integrally molded tab or flange at the outside edge of a belt module, positioned to require forcing of the length of the rod past the somewhat flexible tab or flange (or manually holding back the tab), with the tab then springing back to an undeformed position when the rod has been fully inserted. The intention is then for the tab or flange to prevent outward movement of the rod by interfering with its path of movement. See, for example, U.S. Pat. Nos. 4,925,016, 5,058,732, 5,156,262 and 5,156,264. Another approach has not involved a movable tab, but simply a bending path through which the rod must be pushed at the edge of the belt, so that once forced into position past the bend, the rod tends not to migrate out from the belt. The latter type of headless rod retention is shown in U.S. Pat. No. 5,372,248 and a similar arrangement is shown in U.S. Pat. No. 5,598,916, where an off-axis hole is provided in a module edge member. See also U.S. Pat. No. 5,573,106. Examples of other forms of headless rod retention are shown in U.S. Pat. Nos. 4,993,544 and 4,893,710.

Some types of headless connecting rod retention cause excessive wear against the belt module or against a retaining element or the rod itself, both in radius and linear travel belts.

Removal of retaining rods in general has often required the cooperation of at least two technicians, one to pull the rod from one side of the belt and the other to push or strike or otherwise manipulate the rod from the other side of the belt, which can be impractical.

It is an object of this invention to overcome problems of excessive module or rod wear caused by the rod retention system employed, both in radius and linear travel belts, while also providing a simple and easily used arrangement for engaging the rod retention and further for releasing the rod retention when desired. Another object, in a specific embodiment of the invention, is to facilitate release of the retaining rod by a single person operating from only one side of the conveyor belt.

SUMMARY OF THE INVENTION

A connecting rod retention system in according with the invention, for straight or radius type modular conveyor belts, avoids the need for rod heads or any form of movable flange or tab for locking the rod in place. In addition, the invention in one preferred embodiment allows a connecting rod to be freely and easily pushed into the assembled position through two sets of interdigited projections of successive module rows, without interference or force required for assembly. Wear of the rod, the rod retention device and the modules due to the rod retention arrangement is minimized, in part because the rod is free to rotate and a retention device on the rod preferably is free to rotate relative to the rod and is not squeezed or ground between modules.

In one embodiment, a rod retention system for a modular plastic conveyor belt of the character described above includes a groove or slot in the surface of a connecting rod, located so as to be between two of the adjacent interdigited projections from the two successive modules which the rod is to connect. At this narrow location, the groove or slot defines a smaller diameter or dimension on the rod than the outside diameter of the rod. A clip, preferably flat in profile, on its side surfaces, is provided for engaging over the slot or groove area of the retaining rod, between the adjacent interdigited projections. The clip is dimensioned so as to allow it to be forced over the rod at the groove, with the clip yielding due to its inherent flexibility, and to be retained on the rod unless a substantial and deliberate force is applied to remove the clip.

In a preferred embodiment, the groove or slot is a generally circumferential groove around the rod, and the clip comprises a generally C-shaped clip with an open end which is dimensioned to snap over the groove on the rod, and thence to be freely rotatable on the rod.

In one preferred embodiment the connecting rod is formed of plastic material, and the retaining clip is also formed from a plastic material, which may be acetal (although a steel rod or steel clip may be used). The retention system of the invention avoids wear between the conveyor module itself and the retention means, while also allowing fast and easy assembly using tools already available for brass or steel ring retainers used in other fields. Further, by firmly holding the belt, one can remove any of the rods with a punch and hammer, which provides sufficient force to dislodge and pop the retaining clip off the rod and out of the belt.

The retention device cannot escape by itself provided the material utilized for the retaining clip is one with a good memory, such as the plastic material acetal; this allows the C-shaped clip to be forced open for assembly, while quickly returning to its original configuration after being positioned in the rod groove.

In some embodiments of the invention, the modular plastic conveyor belt utilizes discontinuous connection rods such as disclosed in U.S. Pat. No. 5,181,601. Such a discontinuous connection rod may include a free-floating middle section and two opposed edge or side rod sections. With the retention system of the present invention, the two outer rod sections each have the retention device of the invention, with a groove and the clip engaged over the groove; or one end of the belt is closed and the clip is on the rod section at the opposite end.

In some belts, particularly radius type belts, the faces of adjacent interdigited link ends between which the clip is positioned are reduced in profile. This is to provide ample lateral space for the clip between link ends, to avoid squeezing of the clip and wear of the clip and/or link ends due to relative side forces acting between modules, particularly on curves.

Another embodiment of a headless rod retention system of the invention employs a retention rod capable of some degree of bending without damage, whereby the rod is bent and inserted through the module row and having been so inserted, reverts to its normal, straight configuration and is laterally retained therein by a solid blocking structure provided at each end of each belt module, in the position of a link end but without a rod hole and not functioning as a link end. The insertion of the rod is made possible by the presence of a space inboard of the blocking structure at least at one side of the module row, free of rod-capturing link ends, which allows the rod to be inserted without the need for bending beyond the bending tolerance of the rod. This system allows removal of the rod by a single person from one side of the belt.

In a preferred form of the above embodiment, link ends or projections extend into the spaces noted above, to overlap the position of the rod, and these link ends are regularly spaced apart, but each comprises essentially a half-ring structure. The half-ring projections cradle the rod on its upper side, such that the rod is unconfined at the bottom of the belt. The half-ring structures, being open at bottom, enable the rod to be slidingly inserted into or removed from the generally aligned link end openings, while providing mechanical interaction and some support between the rod and the half-ring structures of the special link ends of each module.

In one variation of the above embodiment, the connecting rod is configured into a temporary bend for insertion and removal, but the end of the rod has a head which, when assembled, resides just inboard of a belt edge member having a hole. The head prevents the rod from migrating outwardly.

In a further embodiment, a headless connecting rod is retained in the belt via a preformed bend in the rod which becomes partially straightened when the bend is forced through a hole in the belt edge structure. Once within the belt, the rod resumes its prebent configuration, placing the end of the rod offset from the hole in the belt edge and retaining the rod in the belt.

Accordingly, a principal object of the invention is to provide a simple and easily operated and assembled arrangement for retaining and removing connecting rods in a modular plastic conveyor belt, without rod heads and without the need for special moveable elements on the modules. These and other objects, advantages and features of the invention will be apparent from the following description of a preferred embodiment, considered along with the accompanying drawings.

DESCRIPTION OF THE DRAWINGS

FIG. 2 is a plan view similar to FIG. 1 but showing a portion of a radius type conveyor belt, in a curve, again with the retention system of the invention.

FIG. 3 is a detail view showing a part of a connecting rod for a modular conveyor belt, illustrated with a retaining clip engaged on the rod in accordance with the retaining system of the invention.

FIG. 4 is a profile elevation view of the retaining clip, in one embodiment.

FIG. 5 is a plan view of a retaining clip in one embodiment.

FIG. 6 is an enlarged detail view showing a groove or slot on the connecting rod.

FIG. 7 is a schematic view showing an example of an alternative form of clip which can be used in the rod retention system.

FIG. 10 is a bottom plan view of a single belt module as shown in FIG. 8.

FIG. 11A is a sectional view as seen along the line 11A—11A in FIG. 10, showing the cross-sectional structure of the belt module through a regular link end.

FIG. 11B is a sectional view as seen along the line 11B—11B in FIG. 10, showing the cross-sectional structure of the belt module through a special, half-ring link end.

FIG. 12 is a fragmentary bottom plan view showing alternative structure to that shown in FIGS. 8–10.

FIG. 12A is a side elevation detailed view showing rod assembly.

FIG. 13 is a partial perspective view similar to FIG. 8 and showing another alternative structure.

FIG. 14 is a perspective view similar to FIG. 8, showing a similar embodiment with a shorter belt pitch.

FIG. 15 is a perspective view showing the belt modules of FIG. 14, connected by a retaining rod.

FIG. 16 is a bottom plan view of a single belt module of the type shown in FIGS. 14–15.

FIG. 17A is a sectional view as seen along the line 17A—17A in FIG. 16, showing cross-sectional structure of the belt module through a regular link end.

FIG. 17B is a sectional view as seen along the line 17B—17B in FIG. 16, showing cross-sectional structure of the belt module through a special half-ring link end.

FIG. 18 is a perspective view showing the end of one module in accordance with a further embodiment of the invention wherein the connecting rod has a preformed bend.

FIG. 19 is a sectional view showing a portion of two interdigited modules in accordance with another embodiment wherein the connecting rod has a head located inboard of an edge component of the belt, again involving bending of the rod for insertion and removal.

DESCRIPTION OF PREFERRED EMBODIMENTS

Figure 1:
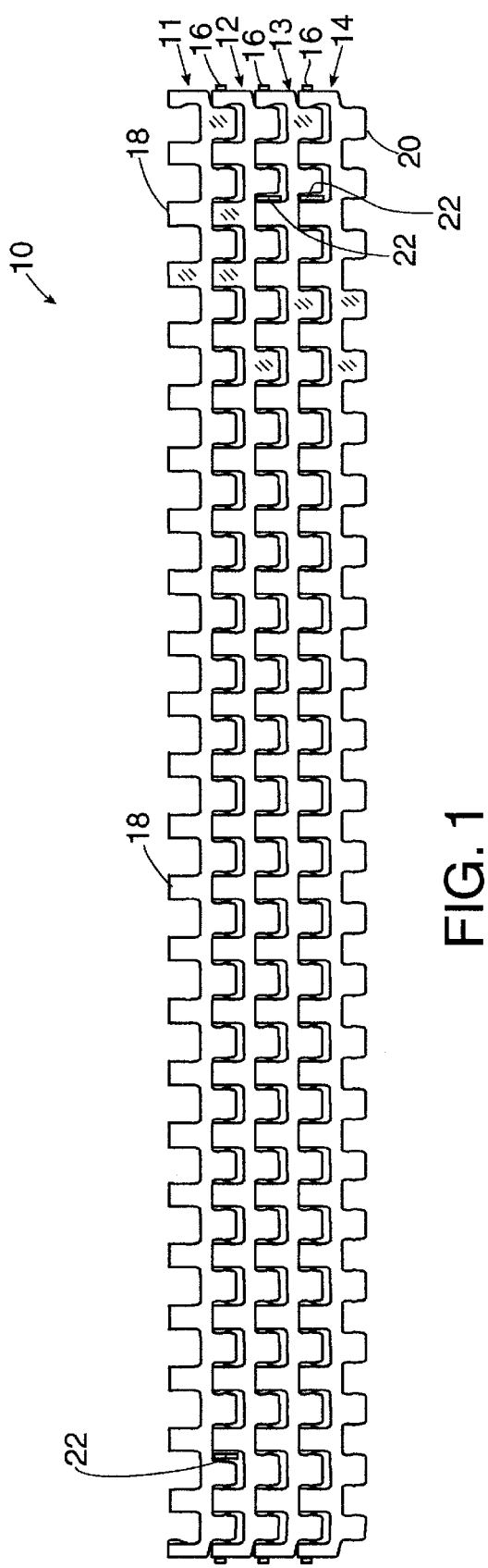
FIG. 1 is a plan view showing a portion of a modular plastic conveyor belt with the rod retention system of the invention.

FIG. 1 shows in plan view a portion 10 of a modular plastic conveyor belt of the type with which this invention is concerned. In the example shown, plastic integrally molded modules 11, 12, 13 and 14 are held together with retaining rods 16. The retaining rods 16, preferably also of plastic as in previous patents referenced above, including U.S. Pat. No. 5,181,601, pass through transverse openings in sets of projections 18 and 20 of the plastic modules 11–14. The projections or link ends 20 may be called fore or leading projections, and the oppositely-directed projections or link ends 18 may be called aft or trailing link ends for purposes of this discussion, although the belt can be driven in either direction.

In the example shown, single modules 11–14 extend throughout the width of the belt illustrated; however, this is only one example, and in wider belt assemblies the modules will normally be assembled together widthwise and in staggered relationship. For example, a wider belt might have three modules in one row and only two in the next succeeding row. This avoids continuous module seams through the belt, adding strength to the belt widthwise. Such compounding and staggering of modules is well known in the industry.

In the embodiment illustrated, retaining clips 22 are secured onto the connecting rods 16, as illustrated, between interdigited fore and aft projections 20 and 18. These clips are locked onto the rods so that the rods are permitted very little lateral movement in the belt. As can be seen from FIG. 1, these clips 22 can comprise generally C-shaped retaining clips which are snapped over the rod, in a groove, slot or otherwise reduced-circumference portion of narrow width. The grooves or slots are discussed in more detail below.

As can be seen from FIG. 1, the rods 16 can be easily assembled to connect the succeeding module rows, by sliding the rods through the openings in the interdigited projections 18 and 20. Once the rods are in the position desired, a retaining clip 22 is pushed over the rod and snapped into position, the groove or slot having been located in the appropriate position between interdigited projections. Although FIG. 1 shows connecting rods 16 extending from the outermost projections of the modules and of the belt, these rods can be flush or recessed relative to the surfaces of the outermost projections, if desired for a smooth belt edge. Also, different configurations at outermost projections can be employed if desired, for certain types of belt, particularly the type of structure shown in FIG. 2.

In FIG. 2 a radius type plastic modular conveyor belt portion 25 is shown, of the type disclosed in U.S. Pat. No. 5,181,601, the disclosure of which is incorporated herein by reference. Three module rows 26, 27 and 28 are illustrated. The radius conveyor portion 25 is illustrated with integral sideplates 30 (heavier edge projections) as in the referenced patent, and with discontinuous connecting rods 32 as also shown in the referenced patent. Each rod in the illustrated embodiment is made up of two outer or side rod segments 32a, and a center rod segment 32b. The outer rod segments 32a have a slot for groove 34.

In a belt designed for radius as well as straight travel, it is important that the connecting rods 32 be of adequate strength to retain the entire tension of the belt in a very narrow region at the outside of the curve, as discussed in the referenced U.S Pat. No. 5,181,601. Accordingly, the retaining clips 22 of the invention are inward from either edge of the belt, at a location where the slot or groove 34 in the rod will not fall in this region of very high tension.

The rod retaining system is best understood with reference to FIGS. 3, 4, 5 and 6 as well as FIG. 2. The radius conveyor belt embodiment shown in FIG. 2 is made up of staggered rows of modules 26, 27 and 28 as explained above. Thus, the module row 26 has a pair of modules 26a making up that row; the module row 27 has left and right modules 27a and a center module 27b; and the third module row 28 is similar to the row 26, having left and right modules 28a. Dividing lines between adjacent modules are shown, for example, at 27c in the row 27 and at 26c in the row 26. Each module row, and each module, has fore projections or link ends 36 and aft projections 38 ("fore" and "aft" are used for convenience of description; the belt can be driven in either direction). As in radius belts of this type, one set of projections, the aft projections 38 as illustrated, have slotted openings 40 as the transverse openings through the set of projections. When the belt travels around a curve, the outside of the curve, at the right in FIG. 2, experiences a concentration of belt tension stresses near the outside of the belt. As explained in the referenced U.S. Pat. No. 5,181,601, this is the reason for the heavier end projections or integral sideplates 30 shown in FIG. 2. The rod slots 34 in the discontinuous connecting rods 32 illustrated, are remote enough from the outer ends of the belt as to have no adverse effect on the strength capability of the connecting rods. Outer edge stress is the most critical concentration of stress in the rod; in straight belt travel, when the region of the slots or grooves 34 experiences some degree of stress, such stress is far less than what is encountered at the edges and is non-critical.

It is generally sufficient that the slot on groove 34 be inboard from the outer belt edge by at least two fore projections 36 and two aft projections 38. In the form illustrated, the groove is spaced inboard by three projections of each type, i.e., it is located at the sixth inter-projection spacing 39f. The first inter-projection spacing 39a is generally the location of highest and nearly all stress. The second such spacing 39b may also take considerable stress due to rod deformation and slight module deformation under the high tension in a curve. Thus, at the minimum, the slot or groove should be at the third spacing 39c or farther inward; more preferably at least the fourth or fifth spacing 39d or 39e.

FIG. 2 shows grooves 34 and retaining clips 22 at both left and right of the belt section illustrated, i.e. in both outer belt segments 32a.

As shown in FIGS. 3 through 6, the retaining clip or ring 22 has a narrow profile, and the belt groove or slot 34 in the rod is considerably wider. This allows the clip to assume angled positions such as shown in FIG. 3 and also in FIG. 2, to accommodate the angled space relationship existing between interdigited projections when necessary. As one example, if the rod segment 32a and the clip 22 are both formed of plastic material, with the clip being, for example, Delrin (acetal) plastic, the clip may have a thickness of about 1/32 inch, residing in a groove 34 having a width about twice as great, e.g. about 1/16 inch.

FIG. 3 shows the ring or clip 22, which is preferably C-shaped as shown in FIG. 5, being pushed over the slot or groove 34 of the rod or rod segment 32a. As the C-shaped clip 22 is pushed over the groove, the open end 42 of the clip, which has angled opening surfaces 44, opens the clip 22 with a camming action, as is known in metal clips used in other arts. The clip 22, which is preferably plastic, has sufficient flexibility to spread the opening 42 in order to slip over the groove 34 of the rod, and sufficient "memory" to return to its original configuration, thus capturing the clip on the rod. As an example, the open end 42 of the clip may have a minimum dimension of about 0.08 inch, while the diameter of the rod groove may be about 0.116 inch. The depth of the groove or slot 38 may be about 0.02 inch, thus the outer rod diameter being about 0.156 inch in one preferred embodiment which is appropriate for the dimensions outlined. Connecting rods, of course, can be of different outside diameters, depending on the materials used, the specifications and loads on the belt, and the pitch of the belt.

As seen in FIG. 2, in the module row 28 which is lowermost on the page, the inter-projection spacing 39f, i.e., the spacing wherein the reduced-circumference slot or groove 34 is located, may have projections 38a and 36a of reduced profile. This is especially important in radius-type conveyor belts as illustrated in FIG. 2, because of lateral forces acting between succeeding modules under the stress of travel around curves. In many instances, the retaining clip 22 can be squeezed and rubbed with sufficient force to cause wear on the retaining clip, the projections on either side, and possibly the rod. This can occur, for example, in the inter-digited projections 36, 38 which connect the module row 26 to the module row 27 in FIG. 2, where no reduced-profile projections are shown. The lowermost line of interdigited projections in FIG. 2 shows the inter-projection spacing 39f as enlarged due to reduction of the sides of the adjacent projections 36a and 38a. These adjacent projections preferably are formed or ground to essentially a planar surface which is perpendicular to the width of the module row. This provides a wider spacing for the clip 22, a spacing which is free of the typical angled projection ends which are included in radius conveyor modules. The spacing 39f thus is essentially rectangular (although a very small angle exists between the adjacent projections 36a and 38a) and which cannot completely collapse to the point of squeezing, rubbing or grinding on the clip 22. A minimal spacing is assured because of the interaction of link ends or projections closer to the outermost edge, such as at inter-projection spacings 39a, 39b, 39c and 39d.

It should be understood that other configurations of rod slots and clips can be employed. For example, the slot in the rod could be non-continuous around the rod, merely sufficient to enable some form of clip to be securely and positively located on the rod at the desired position and captively held thereon. Some form of indentation in the rod is required for this purpose. Clips can take different forms, although the C-shaped clip or ring 22 illustrated is preferable and advantageous. As another example, a clip formed of stiff metal wire, in the configuration 46 generally as shown in FIG. 7, could be employed. In the preferred embodiment, the generally C-shaped clip such as shown in FIGS. 3, 4 and 5 can have the advantage of being freely rotatable and capable of angular displacement within the groove as discussed above. For this purpose, the diameter of the C-shaped interior bore of the preferred clip 22 may be about 0.118 to 0.120 inch, as compared to the rod diameter of about 0.116 inch in the groove. This gives sufficient clearance for angling of the clip within the groove as shown in FIG. 3 and in FIG. 2.

Figure 9:
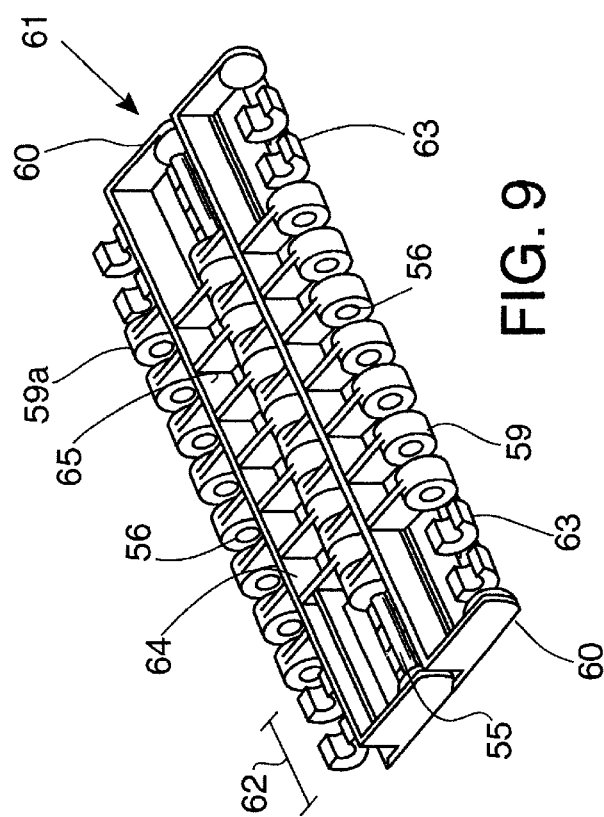
FIG. 9 is a perspective view of a pair of belt modules as in FIG. 8, here showing the two adjacent modules serially connected by a connecting rod.
Figure 8:
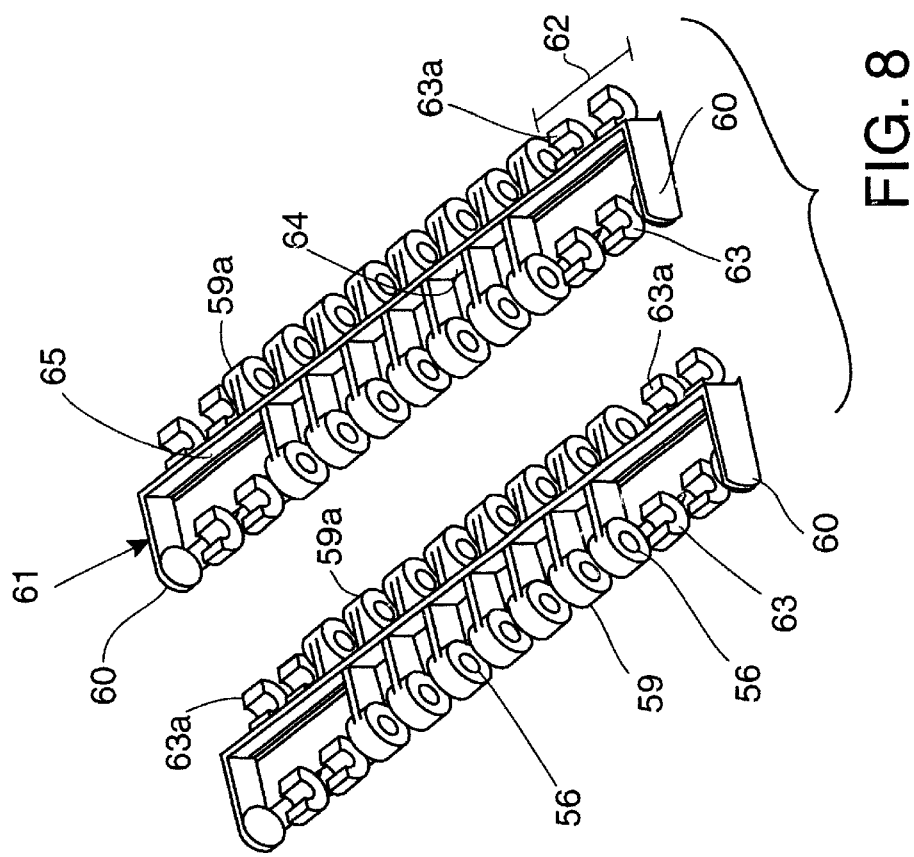
FIG. 8 is an exploded perspective view of a pair of solid top belt modules of a second embodiment of the invention in which the connecting rod is forced into a bending configuration for assembly and removed.

FIGS. 8 and 9 show in perspective, from the bottom side, an embodiment of the invention wherein a retaining rod 55 is threaded through transverse openings 56 in spaced apart fore and aft projections 59, 59a (sometimes called link ends herein) and is prevented from moving laterally by solid blocking structures 60 positioned at opposed ends of each belt module 61. In the modules illustrated the link ends 59 on a first side are longer than link ends 59a on a second side, with a transverse member 65 which is offset from the fore/aft center of the module. The modules may be driven by sprocket teeth entering spaces 64 formed between the link ends 59 and by the transverse members 65, and opposite the member 65, by the opposing link end 59a of a connected adjacent module (FIG. 9).

In this embodiment a space 62 inboard of each blocking structure 60 allows insertion into the module row of a rod, by forcing the rod through a bend. Having been so inserted, the rod reverts to its unbent essentially straight shape. The length of the space at the end of each module row is such that it allows the rod to be inserted without the need for bending the rod beyond its mechanical tolerance and without the need for the application of more force than can be reasonably supplied by a single technician.

Open half-ring structures 63 project into the spaces 62, cradling the inserted rod 55, such that the rod is unconfined at the bottom of the belt, but is cradled on its upper surface, preferably throughout about half its circumference. These halfring structures, being open at bottom, enable the rod to be easily inserted or removed from the generally aligned transverse openings 56, while also providing mechanical interaction and some degree of enhanced support due to the contact between the rod and the half-ring projections close to the ends of the module. FIG. 9 shows the arrangement of two such belt modules serially joined by a retaining rod 55. This embodiment of the invention allows a single technician to remove or insert a retaining rod from one side of the belt, using pliers or a special tool, without the need for assistance at the other side of the belt to manipulate the module or rod or apply force to the rod. Preferably the rod is not required to bend more than about 45°, for example, for a rod made of acetal or nylon and about $\frac{1}{8}$ to $\frac{3}{16}$ inch diameter. More preferably, the rod should be required to bend not more than about 20°. The rod's configuration on insertion or removal is shown in FIG. 10A, with the angle as shown between the pivot axis and the rod 55, due to the bend in the rod. FIG. 12 shows in section one end of two assembled modules, with half-ring link ends 63 from the two modules shown interdigited. The modules are inverted, bottom side up, for consistency with the other drawing figures.

FIG. 10 shows in bottom plan view a single belt module 61 of the configuration shown in FIGS. 8 and 9. The projections 59, which may be regularly spaced apart, are shown with transverse openings 56 through which the rod 55 is to be threaded. The half-ring structures 63 are at outer ends of the module, located at the spaces 62 at the end of each module 61.

Although the drawings show single modules having the blocking structures or closed link ends 60 at each end of each module, this only illustrates modules for use on a narrow belt, e.g. about 6 inches. In most cases the belt will be wider, comprised of module rows each including several modules widthwise. In that case, edge modules will have blocking members 60 at one end, but the other end of such a module will be adapted to be abutted with another module widthwise, to form a wide belt whose other end has an edge module with a blocking structure. Interior module edges can be generally as shown in U.S. Pat. No. 5,181,601 of KVP Systems, Inc. For this reason, FIG. 10 is shown with break lines indicating the module can be virtually as wide as desired, with the blocking structures 60 at each end of FIG. 10 representing the ends of edge modules in most cases, although the structures shown in FIG. 10 can represent ends of a single module.

FIG. 11A shows in cross section the structure of the module shown in FIG. 10. FIG. 11 shows the module structure as taken through a regular link end 59*a* at the second side of the module having the shorter link ends, and through a spacing between the regular link ends 59 at the first side of the module with the longer link ends. FIG. 11B, on the other hand, is taken along the line 11B—11B in FIG. 10 and shows the half-ring link end 63*a* from the second side of the module (not in section) and a half-ring link end 63 at the first side of the module (in section). FIG. 11B also reveals, beyond the half-ring link end 63, a portion of the blocking structure 60 at the end of the module. FIG. 11B additionally shows the transverse member or cross member 65 of the module, which is displaced toward the second side of the module in this particular embodiment of solid top module, as discussed above.

It should be understood that the half-ring link ends 63 and 63*a* at the ends of the first and second sides of the modules or module rows can be configured differently. FIG. 12 is a partial bottom plan view showing an alternative construction in which a solid structure 66 replaces the two half-ring link ends 63 shown at the right side of FIG. 10. The single structure 66 extends through the same width, i.e. through the space 62 shown in FIG. 10. (The half-ring structure 66 may be formed as a half-cylinder (or less than a half-cylinder), extending widthwise to and adjoining the blocking structure 60 at the edge of the module. Thus, a connecting rod is partially cradled by the wide half-ring structure 66.

To the left of the structure 66 in FIG. 12 is a gap 68 to accommodate a link end 59*a* from an adjacent module, similar to the link end 59*a* at the other side of the belt shown in FIG. 12. In this arrangement, no half-ring link ends are included at the second side of the module, between the illustrated regular link end 59*a* and the edge of the module. In this area the module simply has an angled edge 64 which is similar to the edges 64 shown in FIGS. 11A and 11B, shaped to engage against the exterior barrel shape of a succeeding link end, but in this case against the barrel shape of the wide half-ring structure 66.

A further modification (not shown) is that the half-ring structure 66 of FIG. 12 need not have the full half-cylindrical shape but need only have a downward curve at the leading edge (which could be the trailing edge of the module), providing a partial barrel shaped surface adjacent to which an angled edge 64 of an adjacent module is positioned in the assembled belt, so that the closed-top belt remains essentially closed as the belt bends at connecting rods traveling around a sprocket.

FIG. 13 shows a further variation of the structures shown in FIGS. 8–12. This embodiment has a thicker end link providing a blocking structure 70 defining a ramp 72 which is included to aid in insertion and removal of a connecting rod, by helping to guide the rod.

FIGS. 14–17B show a smaller-pitch embodiment of the modules and belt section shown in FIGS. 8–12. In this form of the module and belt, which still may be a solid top embodiment, the pitch is so short as to provide only a very slender flat portion at the top of each module, best seen at 74 on the underside of the belt in FIG. 16. As in the earlier embodiment, at each end of the belt (and shown on a single module 76 in FIGS. 14 and 15) is a solid blocking structure 78 adjacent to a space 79 wherein a connecting rod is unconfined from the bottom side. Although both left and right sides of the module 76 are shown blocked, the belt usually is formed in much wider widths, and a typical module would have only the blocking structure at one end, to mate widthwise with an additional module for staggered assembly of module rows so that seams between adjacent modules are staggered from row to row, as shown in the earlier KVP patent referenced above. Thus, FIGS. 14–17A show blocking structures 78 on both ends of a single module only for purposes of illustration, although a narrow, single-module width belt can be formed in this way if desired. FIG. 16 shows the module broken, so that the structure in FIG. 16 can comprise a belt width with several modules between the module ends at left and right in the figure. The modules shown in FIGS. 14–17A can have a pitch of about one half inch, which has an advantage of allowing the belt to form a tight return over a roller or series of sprockets, providing for transfer of relatively small articles from belt to belt.

As in the earlier embodiment, the modules shown in FIG. 14–15 have first and second sets of normal projections 80 and 80*a*, and first and second sets of half-ring edge projections 82 and 82*a*. Variations of this structure can follow the variations shown in FIGS. 12 and 13 and as discussed in the description of those embodiments. A connecting rod 84 is inserted into and removed from the belt in the same manner as discussed above, by bending the rod as it is inserted or removed (FIG. 10A), to clear the blocking structure 78. Once inserted, the belt resumes essentially its straight and undeflected configuration.

FIGS. 17A and 17B are similar to FIGS. 11A and 11B, showing cross sections of the smaller-pitch modules 76 at different locations 17A and 17B—17B of FIG. 16. Again, a beveled or sloped edge 64 is shown where the module engages closely adjacent to the barrel of an adjacent link end to establish the closed-top structure of this embodiment.

FIG. 18 shows another form of rod retention according to the invention. A module 88 (shown inverted), an end portion of which is shown in FIG. 18, is generally similar to the modules shown in FIGS. 8–11B, but preferably with a smaller space 90, adjacent to an edge member 92, which space 90 has no rod restriction from the bottom. The module portion 88 shown in FIG. 18 is indicated with a connecting rod 94, but without showing the adjoining module which is to be interdigited with the module 88, i.e. with the illustrated module's rear link ends 96 assembled side-by-side with front link ends 98 of the adjoining, not-shown similar module. The space 90 includes a half diameter rear link end 100, and on one side of this link end 100 will be received a regular front link end 98, while on the other side will be inserted a half width front link end 102 which is shown at the front of the module 88. The space 90 can be wider if desired, and the half width link ends 100, 102 can be replaced with somewhat similar structure which does not envelop the connecting rod at all.

The module embodiment 88 of FIG. 18 has a connecting rod hole 104 in the edge member 92, preferably aligned with all other openings in the link ends 96 which receive the connecting rod 94. At an opposite side of the module 88, or of a row of modules, is an edge member which may be similar but without a rod opening, thus serving as a blocking member at the opposite edge of the belt. The rod 94 is retained within the belt by virtue of a preformed bend 106 in the rod. The plastic rod 94 is sufficiently flexible that the preformed bend 106 straightens to an almost linear configuration when the rod is inserted through the hole 104 and through the link ends 96, 98 of adjacent interconnected modules until the bend 106 reaches the edge member 92, at which point the rod is pushed with light to moderate force through the opening 104. The rod then springs back to its preformed configuration with the bend 106, putting that end of the rod offset from the rod opening 104 and preventing the rod from moving out of the belt.

FIG. 19 shows a further embodiment of the invention wherein a rod 110 is retained within a pair of assembled, interdigited belt modules 112. In the embodiment of FIG. 19 the belt portion is again shown inverted. In this embodiment, the rod 110 has a head 114, which prevents the rod from lateral movement out through a hole 116 in an edge member 118 of the belt. The belt may have similar end openings 116 at both ends, with the rod having the head 114 only at one end. In this way, tooling is similar for modules which are to be interconnected by rods having heads formed at the exterior of the edge members 118, or connected by rods as shown in FIG. 19. The rod 110 is inserted and removed from the bottom, by flexing the rod a sufficient distance to clear the blocking end structure 118, including passing the rod head 114 under this structure. As shown in the drawing, a recess 126 is provided to receive or cradle the rod head 114 after the rod has been fully assembled in the belt. This recess both allows the belt to resume a linear configuration after insertion, and helps prevent lateral movement of the rod in the assembled belt.

The sectional view of FIG. 19, taken at the center of the connecting rod 110, shows a module 112 which is in many respects similar to those of FIG. 8, interconnected with a trailing module, a regular link end 120 of which is seen at the left of the fragmentary belt portion shown in the figure. Additional link end structures of the trailing module, shown at 122, may be half-ring link ends such as shown at 100 in FIG. 18 or at 63 in FIG. 8, for example. Alternatively, they can simply provide a relatively flat bed on which the rod 110 lies. FIG. 19 also shows interdigited special link ends 124 of the module 112 which has the blocking edge structure 118, and these interdigited link end structures will follow the same form as the link end structures 122.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In a modular plastic conveyor belt having a top and a bottom and of the type made up of a series of connected elongated molded plastic belt module rows each including one or more belt modules in the row such that belts of varying selected widths can be made up from the modules in a staggered, brick-laid pattern, with the belt module rows connected by rods extending transversely to the width of the conveyor belt, each row having a series of first spaced projections generally regularly spaced and extending in one direction from the row and a series of second spaced projections generally regularly spaced and extending in an opposite direction from the row, the first and second projections of serially adjacent module rows being longitudinally overlapping and juxtaposed when the modules are connected serially in the conveyor belt by the connecting rods extending through transverse openings in the projections, a system of retaining the connecting rods in the belt and preventing lateral movement of the rods out of the belt, comprising:

the connecting rods being capable of bending without damage, to the extent that the rod end can be pulled outside the plane of the belt bottom while being between the edges of the belt, the belt having a blocking structure at each module row, at each of two opposed edges of the belt, the blocking structure being positioned to prevent lateral movement of the rod out of the module row and having a height similar to the height of the regularly spaced projections such that a bottom of the blocking structure is essentially even with bottoms of the regularly spaced projections providing full blocking of the rod at the belt edges, and including a space inboard of the blocking structure at least at one side of the module row, wherein the rod is unconfined from the bottom of the belt so as to allow the rod to be pulled downward from its end in a bending configuration to extend below the blocking structure and below the plane of the bottom of the belt, so that the rod end is clear of the bottom of the blocking structure to remove the rod with a tool or to insert the rod, said space being wide enough to allow the rod to bend sufficiently to be inserted into and removed from the module row without damage to the rod, whereby the rod may be removed or inserted by access to only one side of the belt.

2. The apparatus according to claim 1, wherein each belt module has a closed, flat upper surface and whereby, when modules are linked together, the conveyor belt presents a continuous and solid top surface.

3. The apparatus according to claim 1, wherein the belt modules are provided with, adjacent to the blocking structure at one or both ends of the module, and extending perpendicular to the transverse axis of the module, a plurality of regularly spaced apart projections each of which comprises a half-ring structure such that the rod is unconfined at the bottom of the belt, but is cradled on its upper surface throughout about half its circumference by the half-ring structure, thereby enabling the rod to be inserted or removed from the generally aligned transverse openings, while providing mechanical interaction between the rod and the half-ring projections adjacent to the blocking structure.

4. The apparatus according to claim 1, wherein the space inboard of the blocking structure is of a width sufficient to allow insertion or removal of the rod such that the total bending of the rod does not exceed 45 degrees.

5. The apparatus according to claim 1, wherein the rod is made of a plastic and has a diameter of between $\frac{1}{16}$ inch and one inch.

6. The apparatus according to claim 1, wherein the belt has a pitch of between about 0.25 inch and 1.0 inch and has a width between about 2 inches and about 60 inches and wherein each rod has a diameter of between about $\frac{1}{8}$ inch and about $\frac{3}{16}$ inch.

7. The apparatus of claim 1, wherein said space inboard of the blocking structure has a width between about $\frac{1}{2}$ inch and about 2 inches and wherein each rod has a diameter of between about $\frac{1}{8}$ inch and about $\frac{1}{4}$ inch.

8. The apparatus according to claim 1, wherein the module row has one of said spaces inboard of a blocking structure at both ends of the module row.

9. A method for connecting rows of serially adjacent conveyor belt plastic modules by connecting rods to form a continuous conveyor belt, and for retaining connecting rods within the assembled belt, comprising:

providing a multiplicity of plastic belt modules, each having a series of first regular link ends spaced apart and extending in a first longitudinal direction of a belt in which the module is to be placed, and a series of second regular link ends spaced apart and extending in an opposite direction longitudinal to the belt, with integral, transverse connecting structure secured to the first regular link ends and the second regular link ends, each of the spaced apart link ends having a transverse opening to receive a connecting rod for securing successive modules in a belt, including edge modules for forming an edge of the conveyor belt, the edge modules having at least at one transverse end a blocking structure at the edge of the module and generally in the position which would be occupied by a regular link end, the blocking structure being aligned with the apertures of the regular link ends and being closed sufficiently as to block any lateral movement of a rod which resides in the apertures of the regular link ends, the blocking structure extending fully across the position of the rod so as to fully occlude the rod and block lateral movement of the rod and having a height similar to the height of the regularly spaced projections such that a bottom of the blocking structure is essentially even with bottoms of the regularly spaced projections providing full blocking of the rod at the belt edges, and a space inboard of the blocking structure which is devoid of said regular link ends and which lacks any link end structure which would confine a rod from the bottom of the belt, assembling rows of modules to form a conveyor belt, with at least one module in each module row, and with an edge module with said blocking structure and space at least at one side of each row and with a blocking structure in said edge module at the side of each row positioned to block exit of a connecting rod, interdigiting each row of modules with a succeeding row such that first regular link ends of a row are juxtaposed and interdigited with second regular link ends of a succeeding row, at each junction between rows, inserting a first end of a plastic connecting rod, held at an oblique angle, from below the plane of the bottom of the belt, into the apertures of link ends adjacent to said space, from the bottom side of the conveyor belt and inboard of said blocking structure, and bending the rod to feed the rod clear of and below the blocking structure, and continuing to feed the rod through successive link end apertures with a progressing bend in the rod in an area generally defined by said space, until the second end of the rod passes over the blocking structure such that the connecting rod is fully inserted into the belt, between the two blocking structures at opposed ends of the belt, then allowing the rod to assume essentially its original unbent shape, and thus retaining the connecting rod in place in the belt by the blocking structures at each-end.

10. The method of claim 9, further including a step of removing the plastic connecting rod from the conveyor belt, comprising gripping said second end of the connecting rod with a tool from the bottom side of the belt, where the rod resides within said space unconfined from the bottom of the belt, then bending the end of the rod downwardly relative to the line of link end apertures within which the rod resides until the end of the rod is oriented downwardly at a sufficient angle to clear the blocking structure at the edge of the belt; then, with the rod held in such bent configuration, pulling the rod out from the belt generally at such oblique angle until the first end of the belt is freed of the link ends.

11. The method of claim 9, wherein the edge module includes, at said space between the regular link ends and the blocking structure, at least one link end comprising a half-ring link end structure such that the rod is unconfined at the bottom of the belt, but is engaged on its upper surface throughout about half its circumference by the half-ring link end structure, thus providing mechanical interaction between the rod and the at least one half-ring link end in the absence of regular link ends in said space.

12. In a modular plastic conveyor belt comprising a plurality of modules pivotally connected end-to-end by means of connecting rods extending axially through apertures in interdigited link ends which extend in forward and rearward directions on each module, an improved system for retaining the connecting rods within the belt, comprising:

the belt having an edge including module edges having edge structures with edge openings generally aligned with the apertures of said link ends, the connecting rods each having a rod head at one end of the rod adjacent to one of said edge openings, the head being larger than said edge openings, and the rods being headless at an opposite end, the rods being capable of bending without damage and the rod head residing inboard of the module edge, and including a space inboard of said edge structure at the first edge of the belt, wherein the connecting rod is unconfined from the bottom of the belt so as to allow the rod to be pulled downward from its headed end in a bending configuration to extend below the edge structure to remove the rod with a tool or to insert the rod, said space being wide enough to allow the rod to bend sufficiently to be inserted into and removed from the belt without damage to the rod, whereby the rod may be removed or inserted by access to only one side of the belt, and whereby the rod head of the assembled rod is positioned just inboard of said edge structure, the head being larger than said edge opening such that the rod is confined within the belt.

13. The apparatus of claim 12, wherein the belt modules include an upward recess adjacent to and inboard of said edge structure, positioned to receive a portion of the connecting rod head so as to cradle the rod head adjacent to the edge structure.

14. In a modular plastic conveyor belt having a top and a bottom and of the type made up of a series of connected elongated molded plastic belt module rows each including one or more belt modules in the row such that belts of varying selected widths can be made up from the modules in a staggered, brick-laid pattern, with the belt module rows connected by rods extending transversely to the width of the conveyor belt, each row having a series of first spaced projections generally regularly spaced and extending in one direction from the row and a series of second spaced projections generally regularly spaced and extending in an opposite direction from the row, the first and second projections of serially adjacent module rows being longitudinally overlapping and juxtaposed when the modules are connected serially in the conveyor belt by the connecting rods extending through transverse apertures in the projections, a system of retaining the connecting rods in the belt and preventing lateral movement of the rods out of the belt, comprising:

the connecting rods being capable of bending without damage, the belt having a blocking structure at each module row, at each of two opposed edges of the belt, the blocking structure being positioned to prevent lateral movement of the rod out of the module row, the blocking structure having an opening generally aligned with the apertures of said projections, and the rods having one end with a head larger than the opening such that the blocking structure with the opening prevents lateral movement of the rod out of the module row, and including a space inboard of the blocking structure at least at one side of the module row, wherein the rod is unconfined from the bottom of the belt so as to allow the rod to be pulled downward from its end in a bending configuration to extend below the blocking structure and clear of the bottom of the blocking structure to remove the rod with a tool or to insert the rod, said space being wide enough to allow the rod to bend sufficiently to be inserted into and removed from the module row without damage to the rod, whereby the rod may be removed or inserted by access to only one side of the belt.

15. In a modular plastic conveyor belt having two sides, a top side and a bottom side, and each generally defining a plane, and of the type made up of a series of connected elongated molded plastic belt module rows each including one or more belt modules in the row such that belts of varying selected widths can be made up from the modules in a staggered, brick-laid pattern, with the belt module rows connected by rods extending transversely to the width of the conveyor belt, each row having a series of first regular projections extending in one direction from the row and a series of second regular projections extending in an opposite direction from the row, the first and second projections of serially adjacent module rows being longitudinally overlapping and juxtaposed when the modules are connected serially in the conveyor belt by the connecting rods extending through transverse openings in the projections, a system of retaining the connecting rods in the belt and preventing lateral movement of the rods out of the belt, comprising:

the connecting rods being capable of bending without damage, to the extent that a rod end can be pulled outside the plane of one side of the belt while being between the edges of the belt, the belt having a blocking structure at each module row, at each of two opposed edges of the belt, the blocking structure being positioned to prevent lateral movement of the rod out of the module row and having a height similar to the height of the regular projections such that at one of said sides of the belt the blocking structure is essentially even with the plane defined by said one side, providing full blocking of the rod at the belt edges, and including a space inboard of the blocking structure at least at one transverse end of the module row, wherein the rod is unconfined from said one side of the belt so as to allow the rod to be pulled out from its end in a bending configuration to extend outside the blocking structure and outside the plane of said one side of the belt, so that the rod end is clear of the bottom of the blocking structure to remove the rod with a tool or to insert the rod, said space being wide enough to allow the rod to bend sufficiently to be inserted into and removed from said one side of the module row without damage to the rod.

16. A method for connecting rows of serially adjacent conveyor belt plastic modules by connecting rods to form a continuous conveyor belt having two sides, a top side and a bottom side, each generally defining a plane, and for retaining connecting rods within the assembled belt, comprising:

providing a multiplicity of plastic belt modules, each having a series of first regular link ends spaced apart and extending in a first longitudinal direction of a belt in which the module is to be placed, and a series of second regular link ends spaced apart and extending in an opposite direction longitudinal to the belt, with integral connecting structure secured to the first regular link ends and the second regular link ends, each of the spaced apart link ends having a transverse opening to receive a connecting rod for securing successive modules in a belt, through interdigited link ends of the successive modules, including edge modules for forming an edge of the conveyor belt, the edge modules having at least at one transverse end a blocking structure at the edge of the module, the blocking structure being aligned with the apertures of the regular link ends and being closed sufficiently as to block any lateral movement of a rod which resides in the apertures of the regular link ends, the blocking structure extending fully across the position of the rod so as to fully occlude the rod and block lateral movement of the rod and having a height similar to the height of the regularly spaced projections such that at one of said sides of the belt the blocking structure is essentially even with the plane defined by said one side providing full blocking of the rod at the belt edges, and a space inboard of the blocking structure which is devoid of said regular link ends and which lacks any link end structure which would confine a rod from said one side of the belt, assembling rows of modules to form the conveyor belt, with at least one module in each module row, and with an edge module with said blocking structure and space at least at one side of each row and with a blocking structure in said edge module at the side of each row positioned to block exit of a connecting rod, interdigiting each row of modules with a succeeding row such that first regular link ends of a row are juxtaposed and interdigited with second regular link ends of a succeeding row, at each junction between rows, inserting a first end of a plastic connecting rod, held at an oblique angle, from outside the plane of said one side of the belt, into the apertures of link ends adjacent to said space, from said one side of the conveyor belt and inboard of said blocking structure, and bending the rod to feed the rod clear of and below the blocking structure, and continuing to feed the rod through successive link end apertures with a progressing bend in the rod in an area generally defined by said space, until the second end of the rod passes over the blocking structure such that the connecting rod is fully inserted into the belt, between the two blocking structures at opposed ends of the belt, and then allowing the rod to assume essentially its original unbent shape, and thus retaining the connecting rod in place in the belt by the blocking structures at each end.

* * * * *